United States Patent
Yoon et al.

(10) Patent No.: US 9,191,254 B2
(45) Date of Patent: Nov. 17, 2015

(54) METHOD AND APPARATUS FOR DETECTING ENVELOPE USING DIFFERENCE BETWEEN SAMPLING SIGNALS

(71) Applicant: SAMSUNG ELECTRONICS CO., LTD., Suwon-Si (KR)

(72) Inventors: Seung Keun Yoon, Seoul (KR); Ui Kun Kwon, Hwaseong-si (KR); Sang Joon Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/752,439

(22) Filed: Jan. 29, 2013

(65) Prior Publication Data
US 2013/0259167 A1  Oct. 3, 2013

(30) Foreign Application Priority Data

Mar. 29, 2012 (KR) .................. 10-2012-0032064

(51) Int. Cl.
| | |
|---|---|
| *H03D 1/00* | (2006.01) |
| *H04L 27/06* | (2006.01) |
| *G10L 25/03* | (2013.01) |
| *G01B 9/02* | (2006.01) |

(52) U.S. Cl.
CPC .............. *H04L 27/06* (2013.01); *G01B 9/0209* (2013.01); *G01B 9/02083* (2013.01); *G10L 25/03* (2013.01); *G10H 2250/025* (2013.01)

(58) Field of Classification Search
CPC ...... H04L 27/05; G01B 9/0209; G10L 25/03; G10H 2250/025
USPC ......................................................... 375/340
See application file for complete search history.

(56) References Cited

U.S. PATENT DOCUMENTS

| | | | |
|---|---|---|---|
| 4,423,519 A | * | 12/1983 | Bennett et al. ................ 375/324 |
| 6,552,677 B2 | | 4/2003 | Barnes et al. |

(Continued)

FOREIGN PATENT DOCUMENTS

| | | |
|---|---|---|
| JP | 11-213640 A | 8/1999 |
| KR | 10-0672987 B1 | 1/2007 |
| KR | 10-0897770 B1 | 5/2009 |
| WO | WO 2004/021363 A1 * | 3/2004 ............. G11C 27/02 |

OTHER PUBLICATIONS

Carlos Fritsch, Alberto Ibañez, and Monlserrat Parrilia, "A Digital Envelope Detection Filter for Real-Time Operation," IEEE Transactions on Instrumention and Measurement, vol. 48, No. 6 (Dec 1999): pp. 1287-1293 Zhengguang Xu, Benxiong Huang, and Kewei Li, "An alternative envelope approach for empirical mode decomposition." Digital Signal Processi.*

(Continued)

*Primary Examiner* — Nader Bolourchi
(74) *Attorney, Agent, or Firm* — NSIP Law (57) ABSTRACT

A method and an apparatus for detecting an envelope using a difference between sampling signals are provided. The method includes generating sampling sets based on sampling signals of a modulated signal, and determining a sampling set from the sampling sets. The method further includes determining an envelope component value associated with a sampling signal among sampling signals included in the determined sampling set, based on a difference between the sampling signals included in the determined sampling set, and a difference between sampling signals included in each of the sampling sets other than the determined sampling set. The method further includes detecting an envelope of the modulated signal based on the envelope component value.

20 Claims, 11 Drawing Sheets

(56) References Cited

U.S. PATENT DOCUMENTS

| | | | |
|---|---|---|---|
| 6,566,915 B1 | 5/2003 | Krupnik et al. | |
| 8,026,743 B2 | 9/2011 | Ou | |
| 9,036,758 B2 * | 5/2015 | Yoon et al. | 375/357 |
| 2006/0227986 A1 * | 10/2006 | Swanson et al. | 381/312 |
| 2009/0015328 A1 | 1/2009 | Aoki et al. | |
| 2009/0161896 A1 * | 6/2009 | Swanson et al. | 381/316 |

OTHER PUBLICATIONS

Ui Kun Kwon, Sang Joon Kim, and Seung Keun Yoo, "Synchronization Algorithm of Resonator Isolation System for Efficient Power and Data Transmission," 2012 Global Communications Conference (GLOBECOM) (Dec. 2012) IEEE pp. 3970-3975.*

European Search Report for European Patent Application No. EP 12 19 0321, issued May 7, 2013.*

Cheng, Yeou-Yen, et al. "Phase shifter calibration in phase-shifting interferometry." Applied Optics 24.18 (1985): 3049-3052.

Hariharan, P. et al. "Digital phase-shifting interferometry: a simple error-compensating phase calculation algorithm." Applied optics 26.13 (1987): 2504-2506.

Larkin, Kieran G. "Efficient nonlinear algorithm for envelope detection in white light interferometry." JOSA A 13.4 (1996): 832-843.

Wilhelm, Rainer, et al. "Dimensional metrology for the fabrication of imaging optics using a high accuracy low coherence interferometer." Proceedings of Optical Measurement Systems for Industrial Inspection, vol. 5856, (2005): 469-480.

Extended European Search Report mailed May 8, 2014 in corresponding European Patent Application No. 13159131.5 (10 pages, in English).

* cited by examiner

METHOD AND APPARATUS FOR DETECTING ENVELOPE USING DIFFERENCE BETWEEN SAMPLING SIGNALS

CROSS-REFERENCE TO RELATED APPLICATION(S)

This application claims the benefit under 35 U.S.C. §119 (a) of Korean Patent Application No. 10-2012-0032064, filed on Mar. 29, 2012, in the Korean Intellectual Property Office, the entire disclosure of which is incorporated herein by reference for all purposes.

BACKGROUND

1. Field

The following description relates to a method and an apparatus for detecting an envelope using a difference between sampling signals.

2. Description of Related Art

Envelope detection has been used to process signals in a speech processing field, an image processing field, a data communication field, and the like, in which a modulated signal is received and demodulated. The envelope detection has also been used in a field such as transmission of energy or data.

In an envelope detection method, signal processing is used, for example, a scheme of using a band-pass filter or a low-pass filter in a frequency band, a scheme of using a peak hold in an analytic signal obtained by the Hilbert transform, and the like. However, the signal processing may require a considerable circuit complexity for circuit implementation. Additionally, in a scheme of using an analog circuit, such as a diode, a capacitor, and the like, a circuit complexity is low, but it is difficult to detect a sophisticated envelope. Furthermore, an accuracy of envelope detection by biasing may be reduced, except for a scheme of using a filter in a frequency band.

SUMMARY

In one general aspect, there is provided a method of detecting an envelope, the method including generating sampling sets based on sampling signals of a modulated signal, and determining a sampling set from the sampling sets. The method further includes determining an envelope component value associated with a sampling signal among sampling signals included in the determined sampling set, based on a difference between the sampling signals included in the determined sampling set, and a difference between sampling signals included in each of the sampling sets other than the determined sampling set. The method further includes detecting an envelope of the modulated signal based on the envelope component value.

In another general aspect, there is provided an apparatus configured to detect an envelope, the apparatus including a determining unit configured to generate sampling sets based on sampling signals of a modulated signal, and determine a sampling set from the sampling sets. The apparatus further includes a calculating unit configured to determine an envelope component value associated with a sampling signal among sampling signals included in the determined sampling set, based on a difference between the sampling signals included in the determined sampling set, and a difference between sampling signals included in each of the sampling sets other than the determined sampling set. The apparatus further includes a detecting unit configured to detect an envelope of the modulated signal based on the envelope component value.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
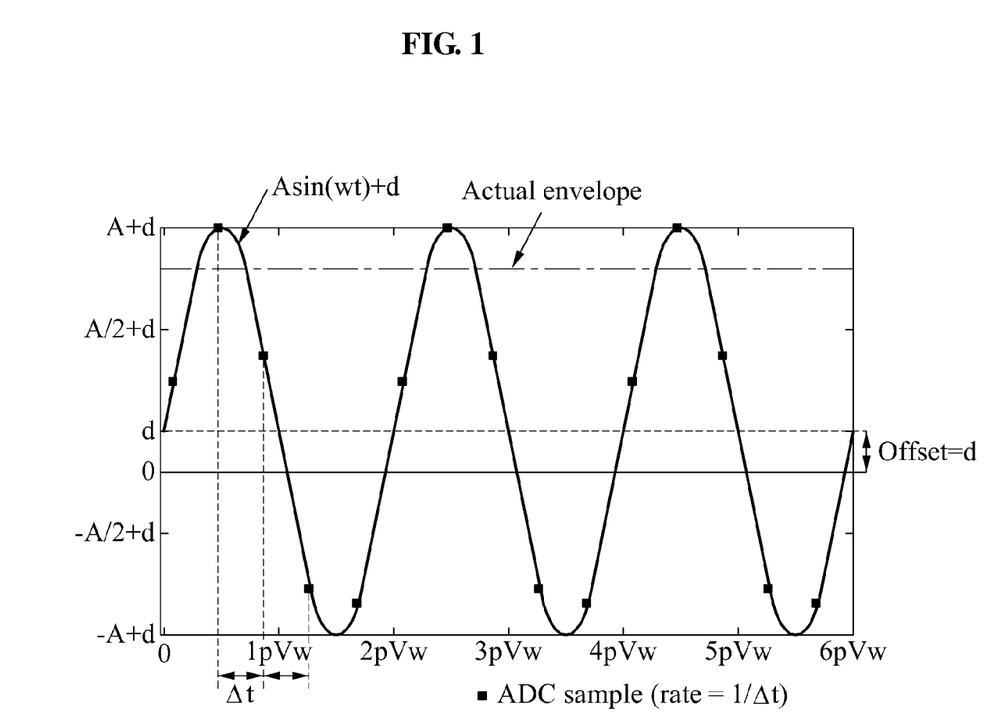
FIG. 1 is a graph illustrating an example of a sine wave with a direct current (DC) offset, and an example of an envelope detected from the sine wave.

FIG. 1 is a graph illustrating an example of a sine wave with a direct current (DC) offset, and an example of an envelope detected from the sine wave. Referring to FIG. 1, the envelope ("actual envelope") may be detected by connecting peak values of the sine wave ("A sin(wt)+d") of a modulated carrier wave signal, and may be referred to as an "envelope curve". Additionally, the envelope of the sine wave may be detected by further biasing (e.g., subtracting) a result obtained by connecting the peak values of the sine wave, by the DC offset.

A continuous sine wave x(t) may be represented as given in the following example of Equation 1:

$$x(t) = A \sin(2\pi f_c t + \theta) + d \quad (1)$$

In Equation 1, A denotes a predetermined constant value, $f_c$ denotes a carrier frequency, and $\theta$ denotes a phase between "0" and "$2\pi$". Additionally, d denotes a constant value with a low flow over time, and may be referred to as the DC offset. Furthermore, x(t) denotes sampling signals of the modulated carrier wave signal obtained by an Analog-to-Digital Convertor (ADC), and may be expressed as $x(t_1), x(t_2), x(t_3), \ldots,$ and $x(t_m)$. The sampling signals may be referred to as "ADC samples". An ADC sampling frequency $f_s$ (e.g., rate) of $1/\Delta t$ is maintained.

The constant value d may be removed by differentiating x(t) with respect to t. However, since actual implementation of the differentiation increases a complexity of a circuit, the envelope detection may be enabled by a simple circuit using a difference between samples as described herein.

Figure 2:
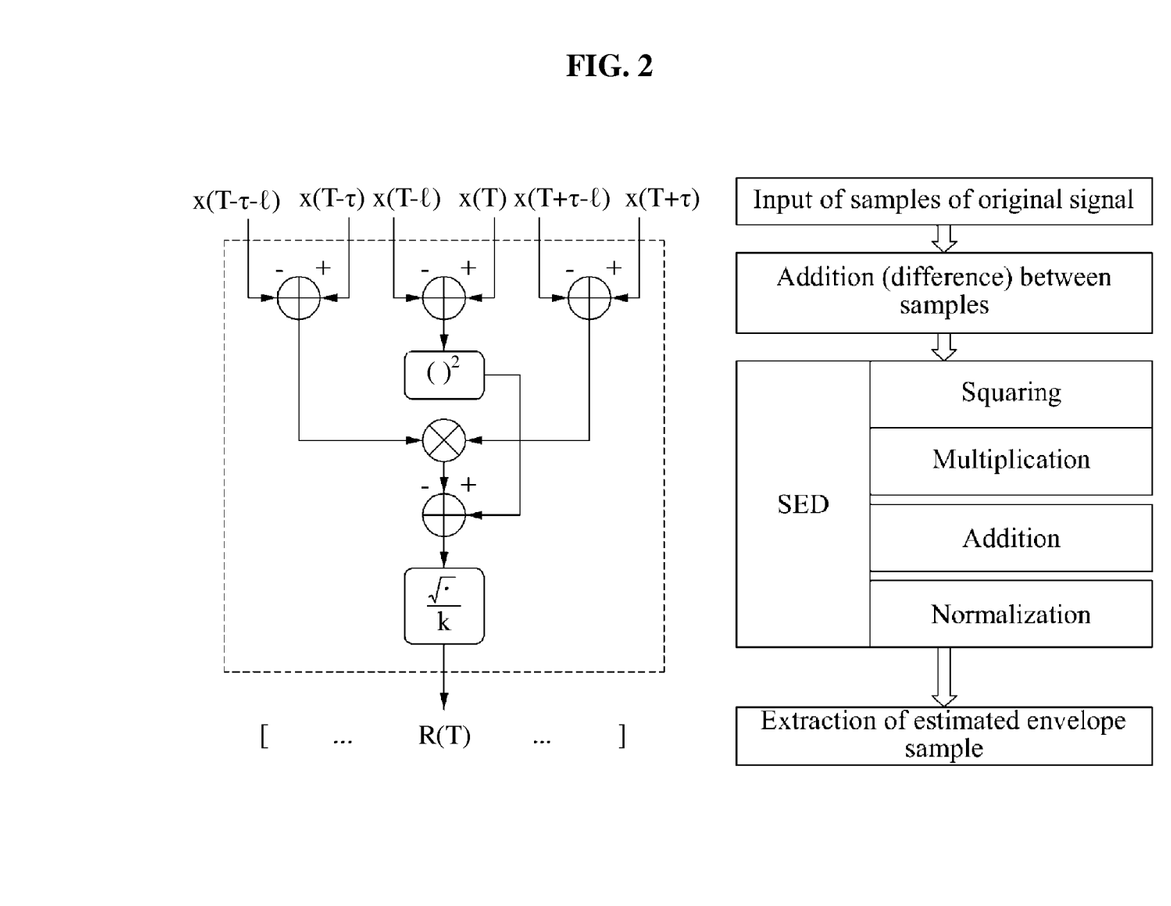
FIG. 2 is a diagram illustrating an example of a method of detecting an envelope based on a difference between six sampling signals.

FIG. 2 is a diagram illustrating an example of a method of detecting an envelope based on a difference between six sampling signals. Assuming that an ADC sampling frequency $f_s$ of $1/\Delta t$ is maintained, when six sampling signals $x(T-\tau-l)$, $x(T-\tau)$, $x(T-l)$, $x(T)$, $x(T+\tau-l)$, and $x(T+\tau)$ of an original signal are input as illustrated in FIG. 2, each of a value of $\tau$ and a value of l is a constant multiple of $\Delta t$.

The six sampling signals may be represented as given in the following example of Equation 2:

$$[x(T-\tau-l), x(T-\tau), x(T-l), x(T), x(T+\tau-l), x(T+\tau)] = [A \sin(\alpha-\epsilon-\gamma), A \sin(\alpha-\epsilon), A \sin(\alpha-\gamma), A \sin(\alpha), A \sin(\alpha+\epsilon-\gamma), A \sin(\alpha+\epsilon)] \quad (2)$$

In Equation 2, $\alpha = 2\pi f_c T + \theta$, $\epsilon = 2\pi f_c \tau$, $\gamma = 2\pi f_c l$, $\tau = c_1 \Delta t$, and $l = c_2 \Delta t$, where $c_1$ and $c_2$ are integers.

When operations (e.g., addition or difference, squaring, multiplication, and normalization) are performed on the six sampling signals as illustrated in FIG. 2, the following example of Equation 3 may be obtained:

$$\begin{aligned}(kR(T))^2 &= (x(T) - x(T-l))^2 - (x(T-\tau) - x(T-\tau-l)) \cdot \\ &\quad (x(T+\tau) - x(T+\tau-l)) \\ &= A^2((\sin\alpha - \sin(\alpha-\gamma))^2 - (\sin(\alpha-\varepsilon) - \\ &\quad \sin(\alpha-\varepsilon-\gamma)) \cdot (\sin(\alpha+\varepsilon) - \sin(\alpha+\varepsilon-\gamma))) \\ &= 4A^2 \sin^2(\gamma/2) \cdot \\ &\quad \left(\cos^2\left(\alpha - \frac{\gamma}{2}\right) - \cos(\alpha-\varepsilon-\gamma/2) \cdot \cos(\alpha+\varepsilon-\gamma/2)\right) \\ &= 4A^2 \sin^2(\gamma/2) \cdot \\ &\quad \frac{1}{2}(1 + \cos(2\alpha-\gamma) - (\cos(2\alpha-\gamma) + \cos 2\varepsilon)) \\ &= 4A^2 \sin^2(\gamma/2) \cdot \sin^2\varepsilon\end{aligned} \quad (3)$$

In Equation 3, k denotes a scaling factor, and R(T) denotes an envelope sample. When the scaling factor k is set to "2 sin($\gamma$/2)sin $\epsilon$", since $\epsilon$ and $\gamma$ are already known constants, the predetermined constant value A (e.g., an envelope component value) may be finally extracted (e.g., estimated), as given in the following example of Equation 4:

$$R(T) = \frac{1}{k}\sqrt{4A^2 \sin^2(\gamma/2)\sin^2\varepsilon} = A \quad (4)$$

Figure 5:
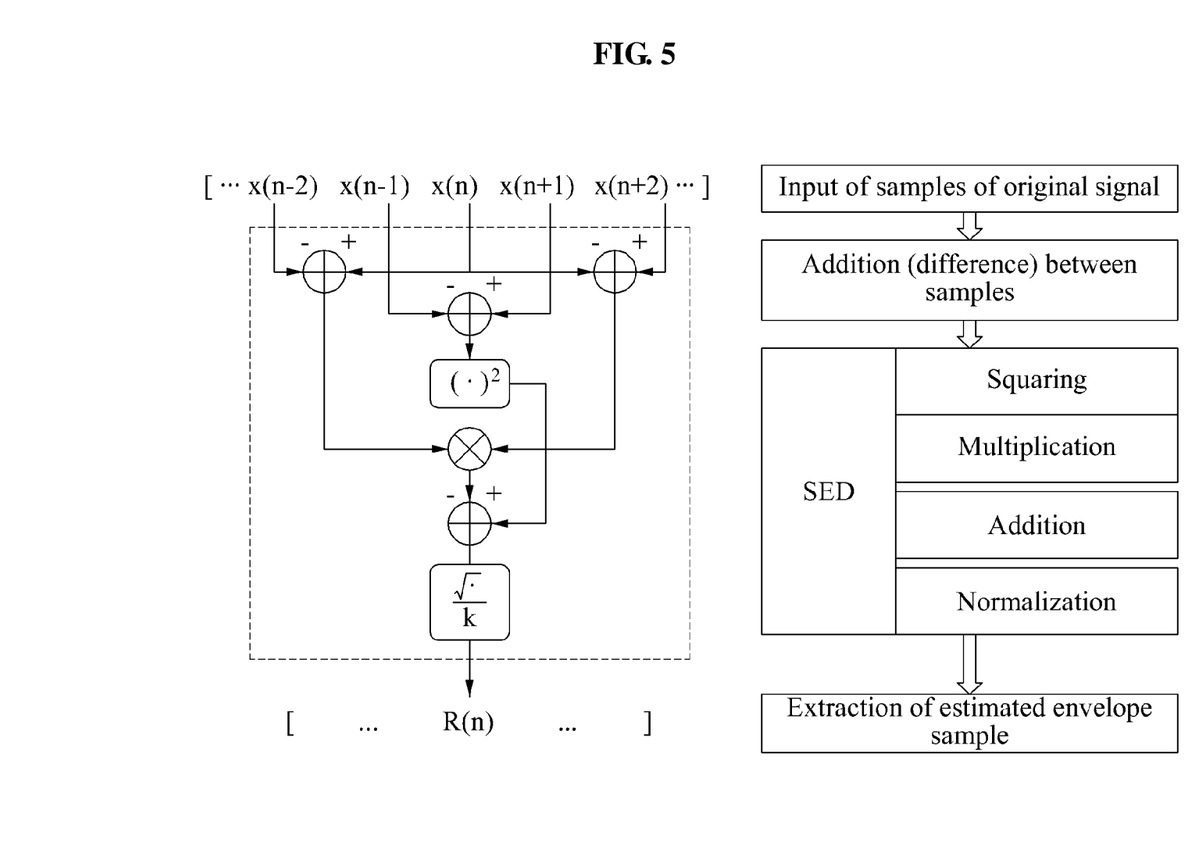
FIG. 5 is a diagram illustrating an example of a method of detecting an envelope based on a difference between five sampling signals.
Figure 6:
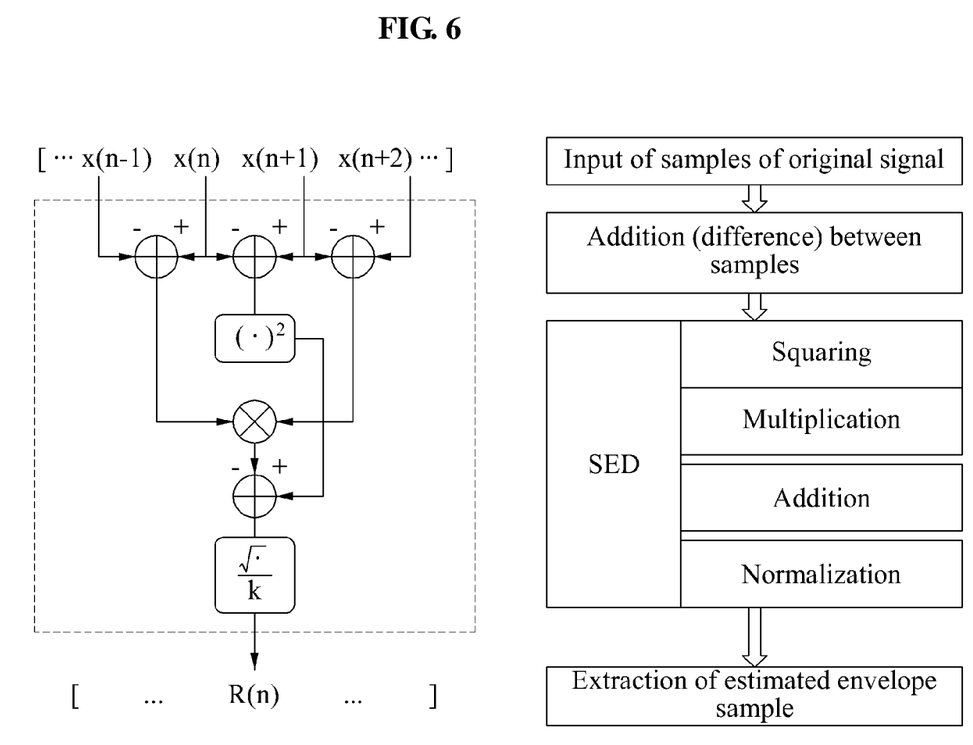
FIG. 6 is a diagram illustrating an example of a method of detecting an envelope based on a difference between four sampling signals.

As illustrated in FIGS. 2, 5, and 6, in a method of detecting an envelope based on a difference between sampling signals, three sampling sets (e.g., pairs of the sampling signals) and two parameters are used. The method of detecting the envelope based on the difference between the sampling signals may be referred to as a "Sequential Difference Envelope Detection (SDED)".

The two parameters may include, for example, a set-length and a set-gap. The set-length ($\gamma = 2\pi f_c l$) includes a distance between sampling signals included in a single sampling set, and the set-gap ($\epsilon = 2\pi f_c \tau$) includes a distance between centers of sampling sets.

As illustrated in FIG. 2, the envelope of the modulated carrier wave signal is detected based on the sampling signals included in three sampling sets, e.g., differences of the sampling signals. The sampling signals included in a single sampling set may be placed at regular time intervals, namely, set-lengths. Additionally, distances, namely, set-gaps, between centers of the three sampling sets may be equal. However, the set-lengths and the set-gaps do not need to be identical to each other.

Figure 3:
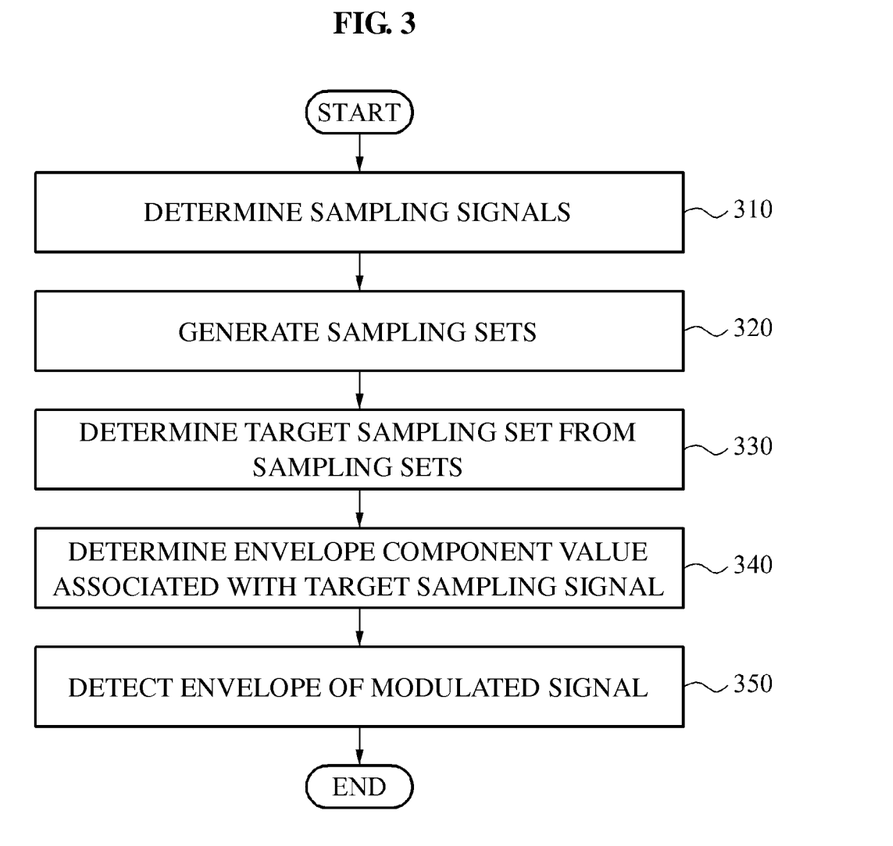
FIG. 3 is a flowchart illustrating an example of a method of detecting an envelope based on a difference between sampling signals.

FIG. 3 is a flowchart illustrating an example of a method of detecting an envelope based on a difference between sampling signals. Referring to FIG. 3, in operation 310, an apparatus that detects the envelope (hereinafter, referred to as an "envelope detection apparatus") determines (e.g., extracts) at least four consecutive sampling signals from sampling signals of a modulated signal. For example, the envelope detection apparatus may determine five consecutive sampling signals or six consecutive sampling signals.

The at least four consecutive sampling signals may be determined at equal time intervals. For example, the at least four consecutive sampling signals may include a first sampling signal, a second sampling signal, a third sampling signal, and a fourth sampling signal. A first time interval between the first sampling signal and the second sampling signal, a second time interval between the second sampling signal and the third sampling signal, and a third time interval between the third sampling signal and the fourth sampling signal, may be equal to each other.

In operation 320, the envelope detection apparatus generates three sampling sets based on the at least four consecutive sampling signals.

In operation 330, the envelope detection apparatus determines (e.g., extracts) a target sampling set from the three sampling sets. A time interval between sampling signals included in the target sampling set may be equal to a time interval between sampling signals included in each of other sampling sets.

In operation 340, the envelope detection apparatus determines an envelope component value associated with a target sampling signal among the sampling signals included in the target sampling set, based on a difference between a component including a difference between the sampling signals included in the target sampling set, and a component including a difference between the sampling signals included in each of the other sampling sets. For example, the component including the difference between the sampling signals included in the target sampling set may be "$(x(T)-x(T-l))^2$", and the component associated with the difference between the sampling signals in each of the other sampling sets may be "$(x(T-\tau)-x(T-\tau-1))*(x(T+\tau)-x(T+\tau-1))$". Operation 340 will be further described with reference to FIG. 4.

In operation 350, the envelope detection apparatus detects an envelope of the modulated signal based on envelope component values associated with the respective sampling signals and determined by the envelope detection apparatus. The envelope detection apparatus may further adjust the time intervals between the sampling signals (e.g., the first time interval, the second time interval, and the third time interval) for the determination of the envelope component value associated with the target sampling signal.

Figure 4:
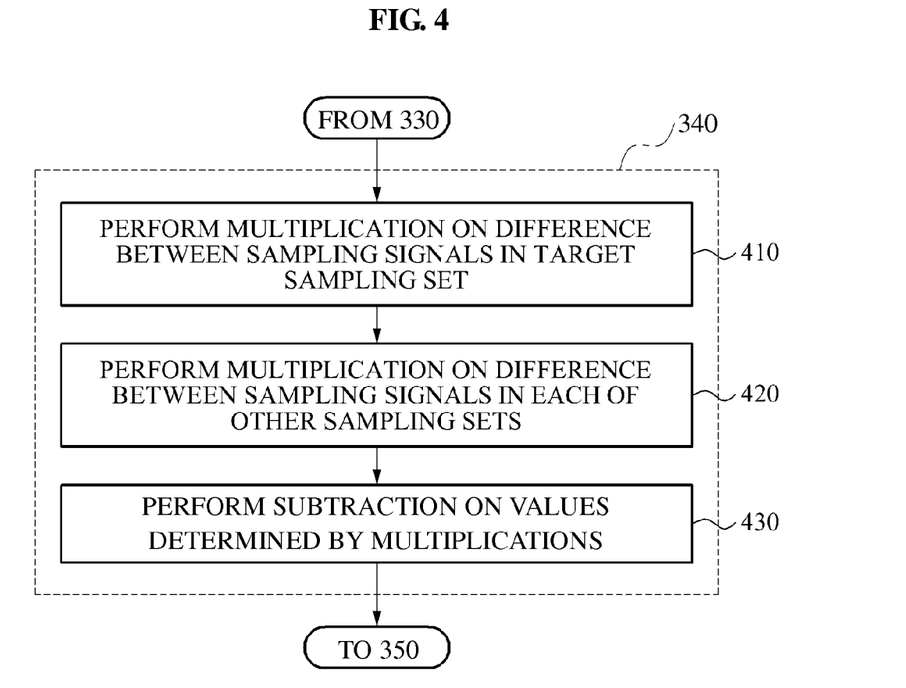
FIG. 4 is a flowchart illustrating an example of an operation of determining an envelope component value in the method of FIG. 3.

FIG. 4 is a flowchart illustrating an example of the operation 340 of determining the envelope component value in the method of FIG. 3. Referring to FIG. 4, in operation 410, the envelope detection apparatus performs multiplication, for example, squaring, on the difference between the sampling signals included in the target sampling set.

In operation 420, the envelope detection apparatus performs multiplication on the difference between the sampling signals included in each of the other sampling sets.

In operation 430, the envelope detection apparatus performs subtraction on values determined by the multiplications to determine the envelope component value associated with the target sampling signal. Additionally, to normalize envelope component values associated with the target sampling signal and determined by the envelope detection apparatus, the envelope detection apparatus may further determine an average value of the envelope component values.

FIG. 5 is a diagram illustrating an example of a method of detecting an envelope based on a difference between five sampling signals. In FIG. 5, a set-length is double a set-gap, and an initial sampling set and a last sampling set share a sampling signal.

For example, when the five sampling signals with regular periods of "$1/f_s$" are determined, three sampling sets "$x(n+1)-x(n-1)$", "$x(n+2)-x(n)$", and "$x(n)-x(n-2)$" are determined, as illustrated in FIG. 5. Among the five sampling signals, the sampling signal $x(n)$ is used twice to perform subtraction. Additionally, the scaling factor k is "$2\sin^2(2\pi f_c/f_s)$".

FIG. 6 is a diagram illustrating an example of a method of detecting an envelope based on a difference between four sampling signals. For example, when the four sampling signals with regular periods of "$1/f_s$" are determined, three sampling sets "$x(n)-x(n-1)$", "$x(n+1)-x(n)$", and "$x(n+2)-x(n+1)$" are determined, as illustrated in FIG. 6. In this example, a set-length is equal to a set-gap. In addition, the sampling signal $x(n)$ is shared between the sampling sets "$x(n+1)-x(n)$" and "$x(n)-x(n-1)$", and the sampling signal $x(n+1)$ is shared between the sampling sets "$x(n+1)-x(n)$" and "$x(n+2)-x(n+1)$". In other words, each of the two sampling signals $x(n)$ and $x(n+1)$ is used twice to perform subtraction. Additionally, the scaling factor k is "$2\sin(2\pi f_c/f_s)\sin(\pi f_c/f_s)$".

Figure 7:
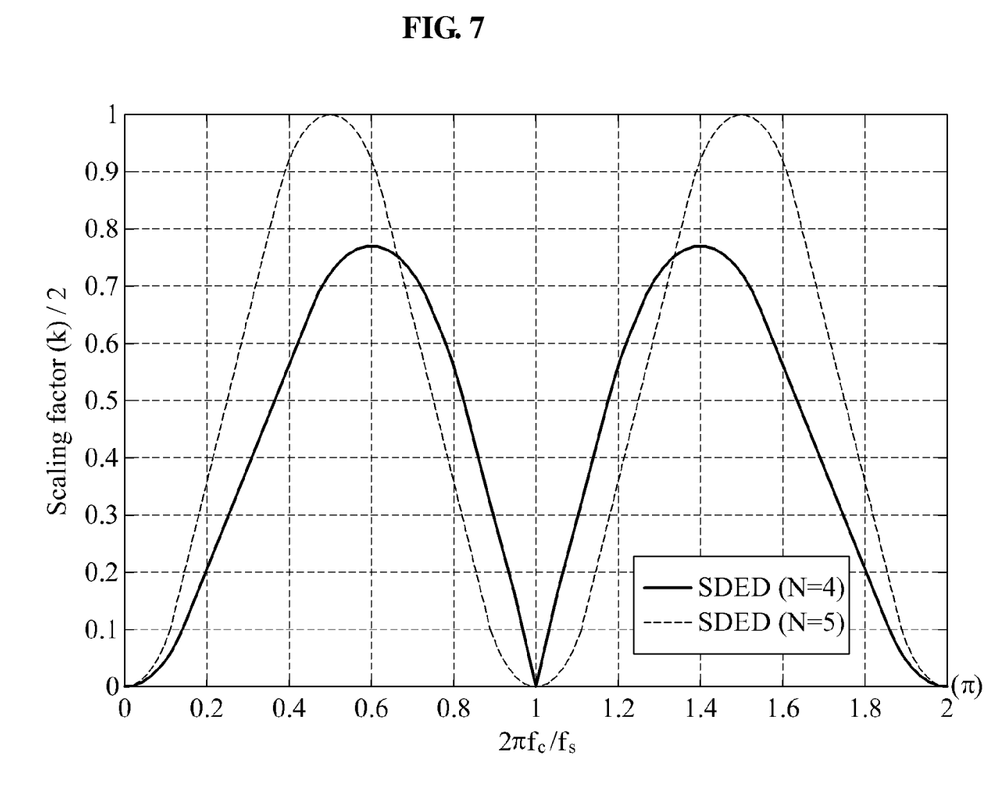
FIG. 7 is a graph illustrating an example of a result obtained by comparing a scaling factor in a method of detecting an envelope based on a difference between four sampling signals, and a scaling factor in a method of detecting an envelope based on a difference between five sampling signals.

FIG. 7 is a graph illustrating a result obtained by comparing a scaling factor in a method of detecting an envelope based on a difference between four sampling signals, and a scaling factor in a method of detecting an envelope based on a difference between five sampling signals. In the example in which the four sampling signals are used, envelope sampling is enabled based on a smaller number of sampling signals. In another example in which the five sampling signals are used, when a value of "$2(f_c/f_s)$" is an odd number, a value of the scaling factor k/2 approaches "1". Accordingly, an envelope may be detected, even when an exact value of a scaling factor is not known.

Figure 8:
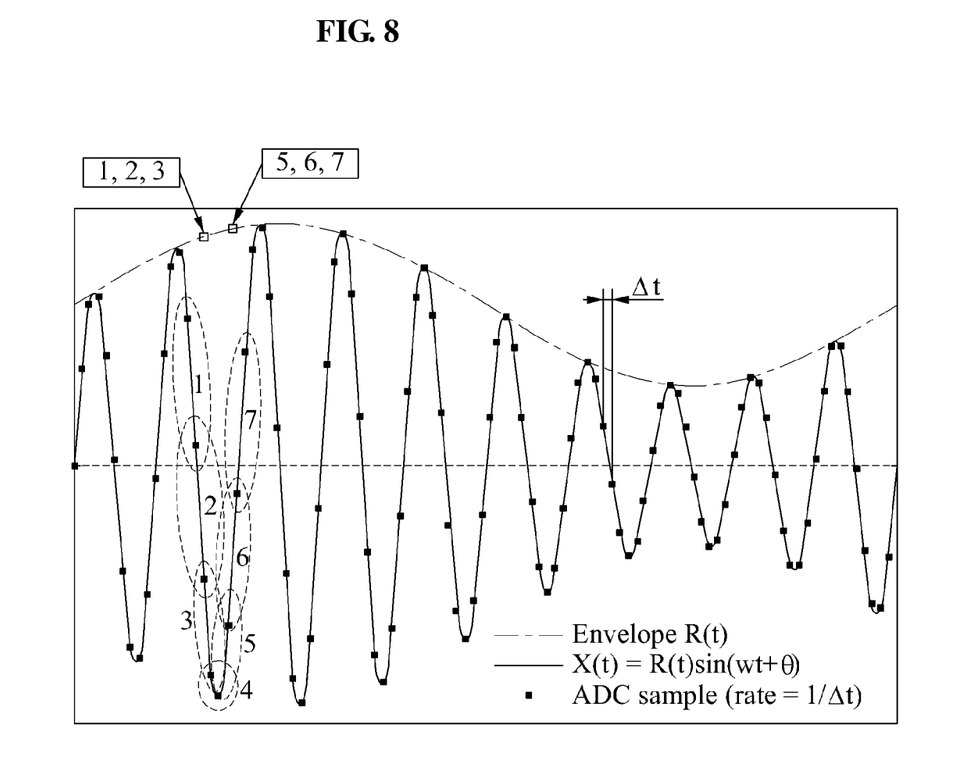
FIG. 8 is a graph illustrating an example of an envelope detected based on a difference between four sampling signals in which both a set-length and a set-gap are $\Delta t$, and a sampling rate is ¼ $\Delta t$.

FIG. 8 is a graph illustrating an example of an envelope detected based on a difference between four sampling signals in which both a set-length and a set-gap are $\Delta t$, and a sampling rate is ¼ $\Delta t$. Referring to FIG. 8, the first envelope sample is derived from sampling sets 1, 2, and 3. The next envelop sample is derived from sampling sets 5, 6, and 7. The envelope sampling period is multiplication of the set-gap $\Delta t$ and the difference between corresponding sampling sets, which is 4(=5−1=6−2=7−3). Hence the sampling period is 4 $\Delta t$. and the sampling rate is ¼ $\Delta t$.

Figure 9:
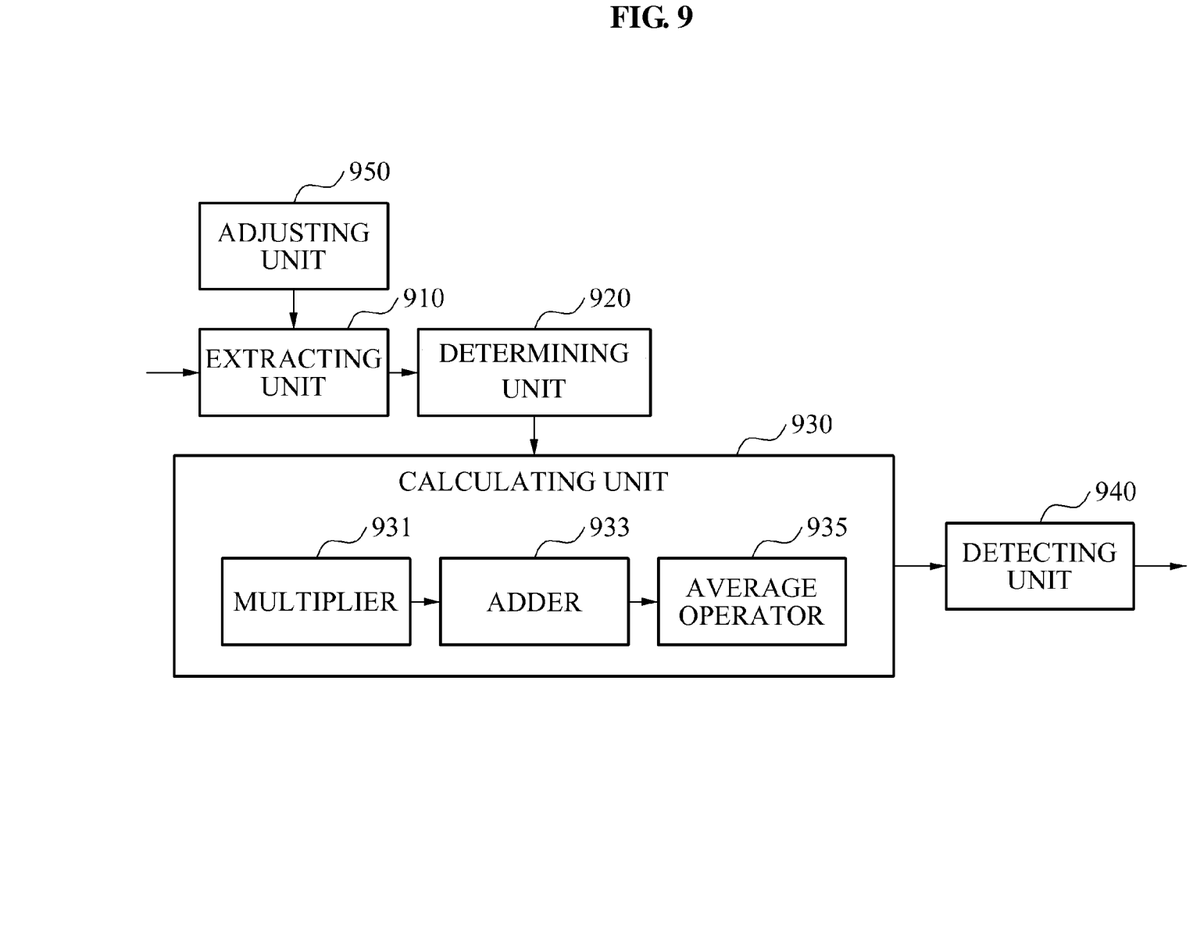
FIG. 9 is a block diagram illustrating an example of an apparatus that detects an envelope based on a difference between sampling signals.

FIG. 9 is a block diagram illustrating an example of an apparatus 900 that detects an envelope based on a difference between sampling signals. Referring to FIG. 9, the apparatus 900 includes an extracting unit 910, a determining unit 920, a calculating unit 930, a detecting unit 940, and an adjusting unit 950.

The extracting unit 910 determines (e.g., extracts) at least four consecutive sampling signals from sampling signals of a modulated signal. The at least four consecutive sampling signals may be determined at equal time intervals. For example, the at least four consecutive sampling signals may include a first sampling signal, a second sampling signal, a third sampling signal, and a fourth sampling signal. A first time interval between the first sampling signal and the second sampling signal, a second time interval between the second sampling signal and the third sampling signal, and a third time interval between the third sampling signal and the fourth sampling signal, may be equal to each other.

The determining unit 920 generates three sampling sets based on the at least four consecutive sampling signals. The determining unit 920 further determines a target sampling set from the three sampling sets. A time interval between sampling signals included in the target sampling set may be equal to a time interval between sampling signals included in each of other sampling sets.

The calculating unit 930 determines (e.g., calculates) an envelope component value associated with a target sampling signal among sampling signals included in the target sampling set, based on a difference between a component including a difference between the sampling signals included in the target sampling set, and a component including a difference between the sampling signals included in each of the other sampling sets. To determine each of the components, the calculating unit 930 includes a multiplier 931 and an adder 933.

The multiplier 931 performs multiplication (e.g., squaring) on the difference between the sampling signals included in the target sampling set. The multiplier 931 further performs multiplication on the difference between the sampling signals included in each of the other sampling sets.

The adder 933 performs subtraction on values determined by the multiplications to determine the envelope component value.

The calculating unit 930 further includes an average operator 935 that determines an average value of envelope component values associated with the target sampling signal and determined by the adder 933, to normalize the envelope component values. The average operator 935 may be included in the calculating unit 930, as illustrated in FIG. 9, or may be separated from the calculating unit 930.

The detecting unit 940 detects an envelope of the modulated signal based on envelope component values associated with the respective sampling signals and determined by the calculating unit 930.

The adjusting unit 950 adjusts the time intervals between the sampling signals (e.g., the first time interval, the second time interval, and the third time interval) for the determination of the envelope component value associated with the target sampling signal.

Figure 10:
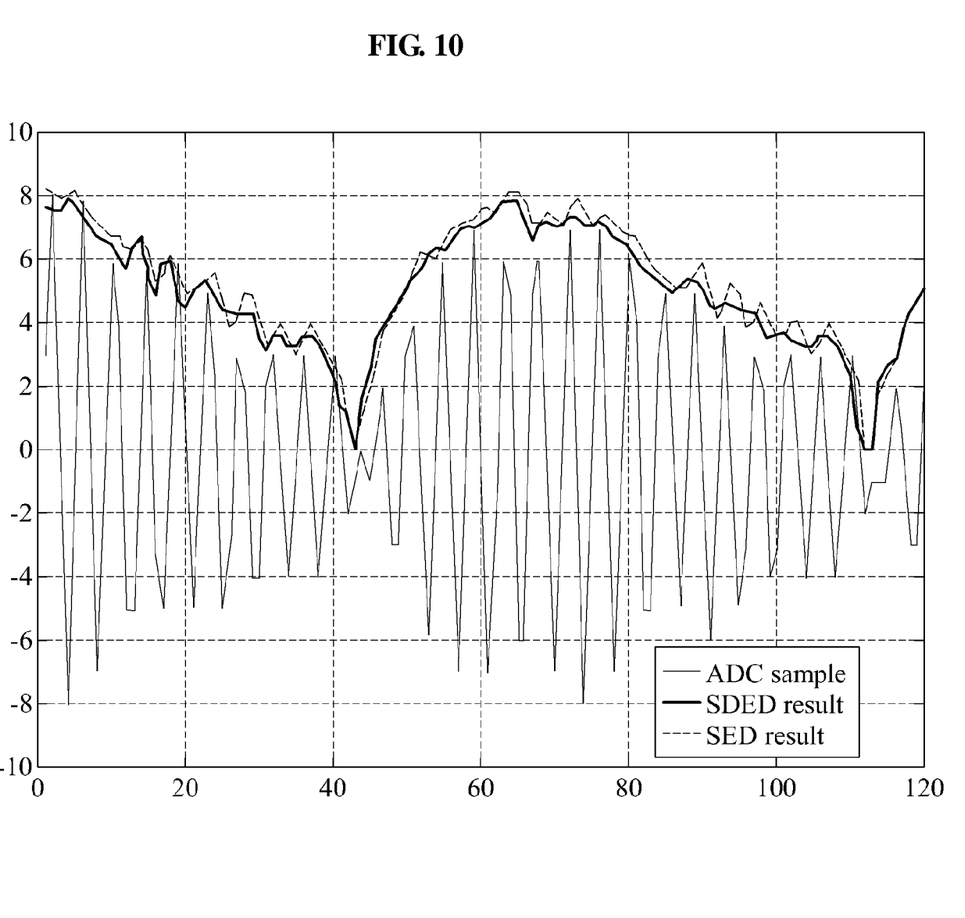
FIGS. 10 and 11 are graphs illustrating examples of results obtained by applying a Sequential Difference Envelope Detection (SDED) and a Sequential Envelope Detection (SED), in a state in which a DC offset is "0", and in a state in which a DC offset is "−1", respectively.
Figure 11:
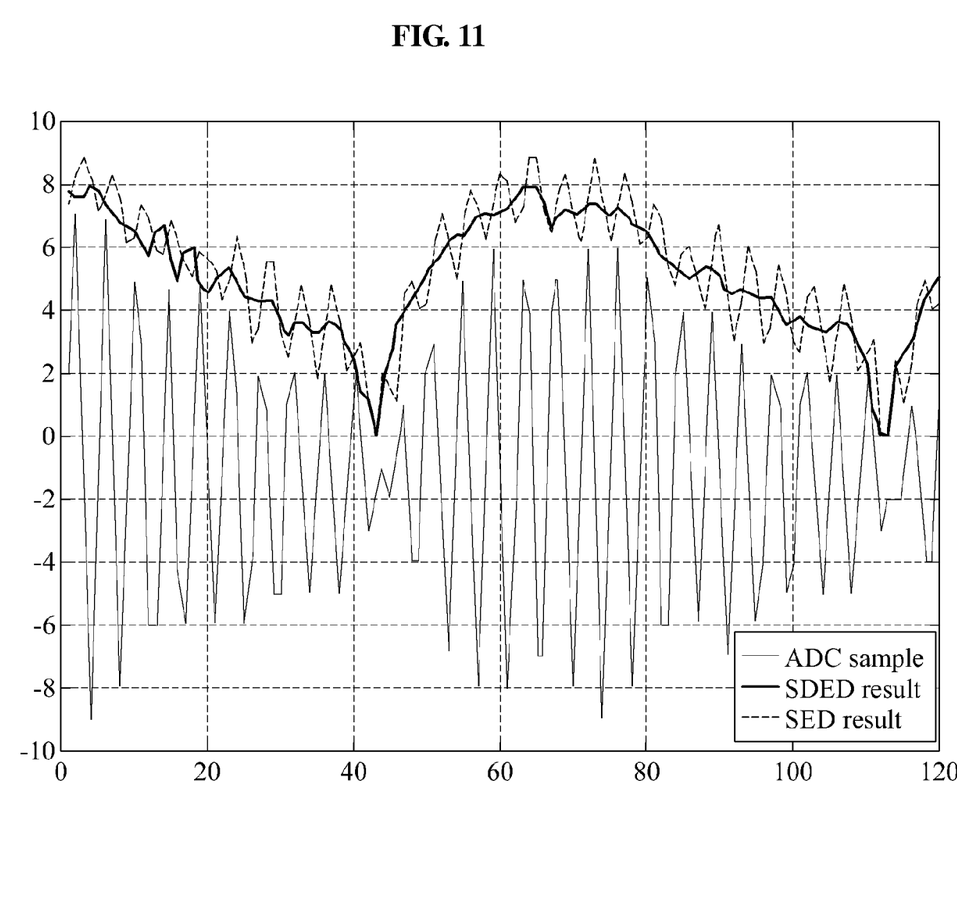

FIGS. 10 and 11 are graphs illustrating examples of results obtained by applying an SDED and a Sequential Envelope Detection (SED), in a state in which a DC offset is "0", and in a state in which a DC offset is "−1", respectively. Referring to FIG. 10, when the DC offset does not exist, envelopes are detected using both the SDED and the SED. However, when the DC offset exists, as illustrated in FIG. 11, only the SDED enables an envelope detection performance to be maintained. That is, in the SDED, an envelope is accurately detected based on a difference between ADC sampling signals, without requiring biasing. Additionally, in the SDED, a number of the ADC sampling signals may be reduced by adjusting a set-length and a set-gap, and the envelope is detected robustly against a scaling factor.

The above-described apparatus and method of detecting an envelope based on a difference between sampling signals may be used to exchange control information or other information between a transmitter and a receiver in a system in which wireless power transmission is performed, for example, a mobile phone, a wireless television (TV), and/or other systems known to one of ordinary skill in the art. Additionally, the apparatus and method may be applied to a bio-healthcare field, and may be, for example, used to remotely transmit a power to a device inserted into a human body, or used to wirelessly transmit a power to a bandage-shaped device for measurement of a heart rate.

According to the teachings above, there is provided a method and an apparatus of detecting an envelope of a modulated signal based on only a low calculation complexity and a simple circuit configuration, using a difference between sampling signals with equal time intervals. Accordingly, the envelope is detected robustly against biasing, since there is no influence by a change in a DC offset. Furthermore, the envelope is accurately detected based on a predetermined sampling rate for the modulated signal, by adjusting the time intervals between the sampling signals included in each of sampling sets.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, that independently or collectively instructs or configures the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of detecting an envelope, the method comprising:
    generating a first sampling set, a second sampling set, and a third sampling set based on samples of a modulated signal, each sampling set includes two sampling signals;
    determining the first sampling set to be a target sampling set;
    determining an envelope component value associated with a sample among samples included in the target sampling set, based on a difference between the samples included in the target sampling set, a difference between samples included in the second sampling set, and a difference between samples included in the third sampling set; and
    detecting an envelope of the modulated signal based on the envelope component value,
    wherein distances between sampling signals included in sampling sets are equal and distances between centers of the sampling sets are equal.

2. The method of claim 1, further comprising:
    determining the samples to comprise at least four consecutive samples from a plurality of samples of the modulated.

3. The method of claim 2, wherein each of the first, second, and third sampling sets comprises a respective pair of the at least four consecutive samples.

4. The method of claim 1, wherein the samples are sampled at equal time intervals.

5. The method of claim 1, further comprising:
    performing multiplication on the difference between the samples included in the target sampling set;
    performing multiplication on the difference between the samples included in the second sampling set and the difference between the samples included in the third sampling set; and
    performing subtraction on values determined by the multiplications to determine the envelope component value.

6. The method of claim 1, further comprising:
   determining envelope component values associated with the sample; and
   determining an average value of the envelope component values.

7. The method of claim 1, further comprising:
   determining the samples to comprise a first sample, a second sample, a third sample, and a fourth sample, from a plurality of samples of the modulated signal,
   wherein a first time interval between the first sample and the second sample, a second time interval between the second sample and the third sample, and a third time interval between the third sample and the fourth sample, are equal to each other.

8. The method of claim 1, further comprising:
   determining the samples to comprise a first sample, a second sample, a third sample, and a fourth sample, from a plurality of samples of the modulated signal; and
   adjusting a first time interval between the first sample and the second sample, a second time interval between the second sample and the third sample, and a third time interval between the third sample and the fourth sample.

9. The method of claim 1, wherein a time interval between the samples included in the target sampling set is equal to a time interval between the samples included in the second sampling set and a time interval between the samples included in the third sampling set.

10. A non-transitory computer readable storage medium storing a program comprising instructions to cause a computer to implement the method of claim 1.

11. An apparatus configured to detect an envelope, the apparatus comprising:
   a determining unit configured to generate a first sampling set, a second sampling set, and a third sampling set based on samples of a modulated signal, each sampling set including two sampling signals, and to determine the first sampling set to be a target sampling set;
   a calculating unit configured to determine an envelope component value associated with a sample among samples included in the target sampling set, based on a difference between the samples included in the target sampling set, a difference between samples included in the second sampling set, and a difference between samples included in the third sampling set; and
   a detecting unit configured to detect an envelope of the modulated signal based on the envelope component value,
   wherein distances between sampling signals included in sampling sets are equal and distances between centers of the sampling sets are equal.

12. The apparatus of claim 11, further comprising:
   an extracting unit configured to determine the samples to comprise at least four consecutive samples from a plurality of samples of the modulated signal.

13. The apparatus of claim 12, wherein each of the first, second, and third sampling sets comprises a respective pair of the at least four consecutive samples.

14. The apparatus of claim 11, wherein the samples are sampled at equal time intervals.

15. The apparatus of claim 11, wherein the calculating unit comprises:
   a multiplier configured to
      perform multiplication on the difference between the samples included in the target sampling set, and
      perform multiplication on the difference between the samples included in the second sampling set and the difference between the samples included in the third sampling set; and
   an adder configured to perform subtraction on values determined by the multiplications to determine the envelope component value.

16. The apparatus of claim 11, wherein:
   the calculating unit is further configured to determine envelope component values associated with the sample; and
   the apparatus further comprises an average operator configured to determine an average value of the envelope component values.

17. The apparatus of claim 11, further comprising:
   an extracting unit configured to determine the samples to comprise a first sample, a second sample, a third sample, and a fourth sample, from a plurality of samples of the modulated signal,
   wherein a first time interval between the first sample and the second sample, a second time interval between the second sample and the third sample, and a third time interval between the third sample and the fourth sample, are equal to each other.

18. The apparatus of claim 11, further comprising:
   an extracting unit configured to determine the samples to comprise a first sample, a second sample, a third sample, and a fourth sample, from a plurality of samples of the modulated signal; and
   an adjusting unit configured to adjust a first time interval between the first sample and the second sample, a second time interval between the second sample and the third sample, and a third time interval between the third sample and the fourth sample.

19. The apparatus of claim 11, wherein a time interval between the samples included in the target sampling set is equal to a time interval between the samples included in the second sampling set and a time interval between the samples included in the third sampling set.

20. The apparatus of claim 11, wherein the calculating unit is further configured to determine the envelope component value further based on a scaling factor.

* * * * *